United States Patent [19]

Cook

[11] 4,004,268
[45] Jan. 18, 1977

[54] IN-LINE STRESS/STRAIN DETECTOR
[75] Inventor: John C. Cook, Dallas, Tex.
[73] Assignee: Teledyne Industries, Inc., Dallas, Tex.
[22] Filed: Feb. 6, 1975
[21] Appl. No.: 547,674
[52] U.S. Cl. .................. 340/17 R; 340/258 B; 340/261; 340/38 L
[51] Int. Cl.² ................................. G01V 1/16
[58] Field of Search ............ 340/7 R, 15, 16 R, 17, 340/38 L, 258 B, 258 C, 258 D, 261, 272

[56] References Cited

UNITED STATES PATENTS

| | | | |
|---|---|---|---|
| 2,418,953 | 4/1947 | Raitt | 340/17 |
| 2,906,994 | 9/1959 | Pellillo | 340/17 |
| 3,375,490 | 3/1968 | Stubblefield | 340/17 |
| 3,659,257 | 4/1972 | Witzell | 340/7 |
| 3,689,875 | 9/1972 | Kostelnicek | 340/17 |
| 3,754,223 | 8/1973 | Shtrikman | 340/258 C |
| 3,840,846 | 10/1974 | Dick | 340/17 |

*Primary Examiner*—Maynard R. Wilbur
*Assistant Examiner*—T. M. Blum
*Attorney, Agent, or Firm*—Dowell & Dowell

[57] ABSTRACT

A plurality of detector units oriented in line to form a linear array to detect intrusions such as footsteps upon the ground under which the array is buried, the coil connections and sometimes the magnet polarities of successively adjacent detector units in the array being reversed so as to cancel out disturbances arriving in a broad frontal manner and caused by spurious events, but to avoid cancellation of disturbances of a localized near-field nature, and the individual detector units comprising variable reluctance units especially constructed to provide high sensitivity, to be protected from hazards of their environment, and to provide elongated zones of sensitivity in a flexible construction.

10 Claims, 7 Drawing Figures

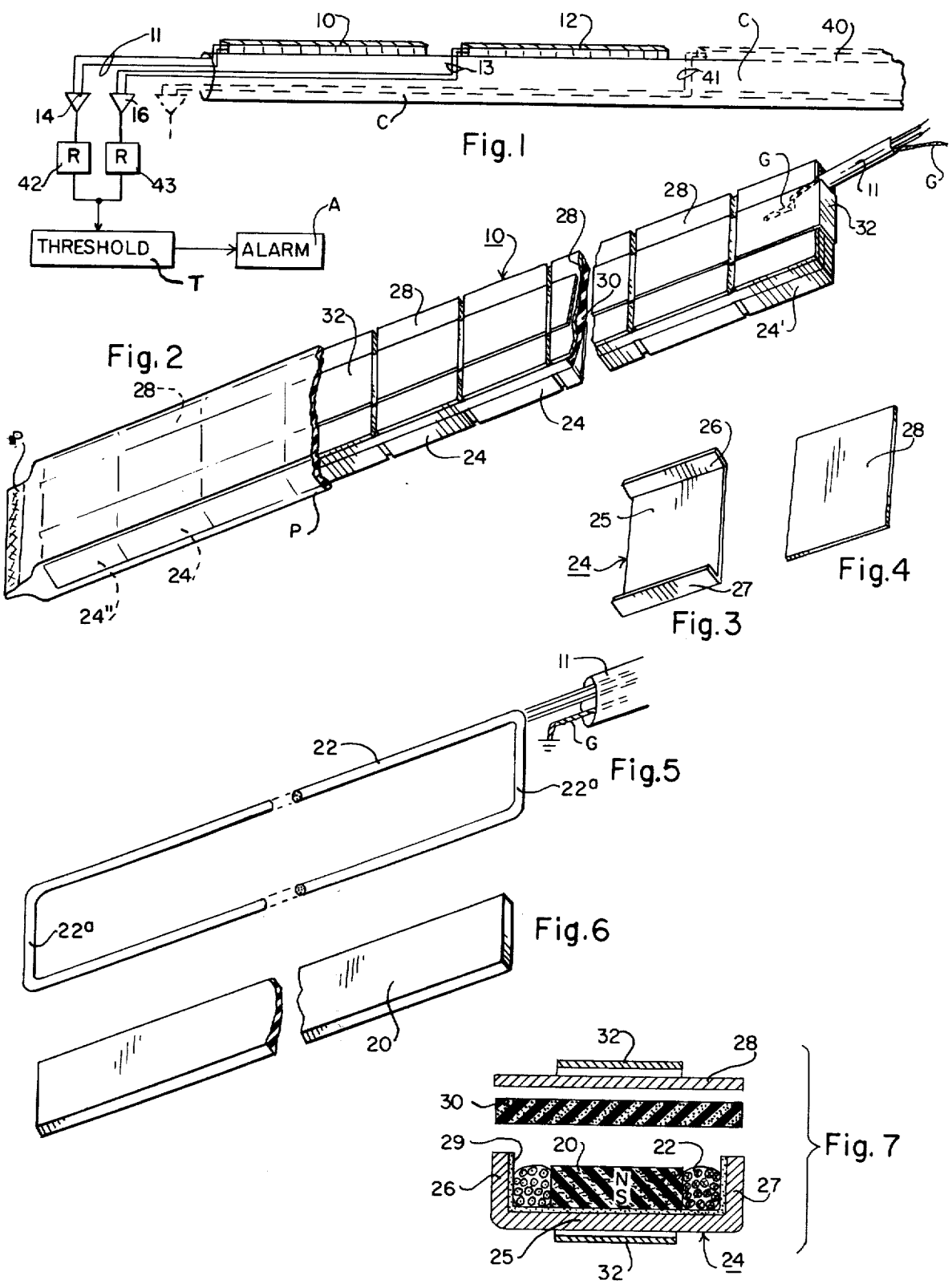

IN-LINE STRESS/STRAIN DETECTOR

FIELD OF THE INVENTION

This invention relates to detectors of the variable reluctance type arranged in an elongated array including multiple adjacent detector units suitable to be buried in a particulate medium, such as the earth, and responsive to stressing of that medium to generate and deliver output signals along cable means by which the individual detector units are interconnected.

BACKGROUND AND PRIOR ART

The guarding of large areas against intrusion always presents a considerable problem despite the large number of systems developed for accomplishing this purpose. For example, in the case of international borders, the expense of installing an effective system is a major consideration. Another persistent problem stems from the need to make a sensitive detection system which does not at the same time deliver an excessive number of false alarms attributable to spurious stimulations, for instance by induced fields from power lines or storms, by natural seismic activities, by the presence of wild animals, and by ageing and drifting of electrical circuits forming part of the system.

There are a number of systems which employ an elongated array of elements which must be excited by a specially generated signal, i.e. tuned bridge circuits, piezoresistive circuits, etc. There are field radiating systems in which disturbance of the generated field by motion therewithin is detected. There are systems in which transducers detect stress-induced strain by the magnetostrictive effect, for example Kardashian U.S. Pat. No. 3,832,704. Elongated variable reluctance transducers are employed in seismic exploration at sea, for instance, as shown in Stubblefield U.S. Pat. No. 3,375,490; Witzell, U.S. Pat. No. 3,659,257; and Kostelnicek U.S. Pat. No. 3,689,875. The present invention is an intrusion detector of the variable-reluctance strain-sensing type which seeks to provide not only an improved signal generating detector configuration, but also an improved array of individual detector units.

THE INVENTION

The present invention employs a series of signal generating detector units arranged in a linear elongated array, each of the detector units comprising variable-reluctance means capable of generating an electrical signal when disturbed. The successive generating units are similar to each other, and comprise paired ferromagnetic plates having their central portions spaced from each other, and the paired plates closely approaching each other at air gaps located in the vicinity of their peripheries. The units include magnet means located between the spaced central portions of the paired plates and having opposite magnetic poles located respectively in the vicinity of each of the plates of a pair so that the axis of the poles is oriented normal to the central portions of the plates. The magnet means is smaller than the area of the plate, and leaves a coil receiving zone between the outer surface of the magnet and the peripheral portions of the plates. The plates are kept apart by a resilient elastic pad located therebetween, and this pad is compressed between the plates when the signal generating unit is stressed from outside, thereby changing the air gap around the periphery of the plates and, in the illustrative embodiment, also between the magnet means and at least one of the plates, thereby inducing a signal in the coil which is located between the magnet means and the periphery of the plates. This particular configuration makes an extremely sensitive generator, so that only a very small movement between the plates is necessary in order to produce a strong signal in the coil. High sensitivity is necessary because the array must detect footsteps with a zone extending several feet normal to the longitudinal extent of the linear array.

In an array in which substantially the full linear length of the array comprises coherent generator means sensitive to strain, the zone of detection is approximately three times as wide as the depth of burial, but the sensitivity of the array to a force applied to the surface of the earth is inversely proportional to the depth at which the array is buried, assuming the earth to have been properly and uniformly compacted above the array after burial.

A number of separate detector units are placed in alignment and may be conveniently joined together by cable means to which the coils are connected to form an array. These detector units can be either placed closely adjacent to each other, perhaps without an external cable interconnecting the units, or they can be mutually spaced apart through substantial distances along the cable, the spacing perhaps being large as compared with the length of one detecting unit. In either case, it is possible for successive units to be so connected to amplifier means that they tend to cancel out spurious signals attributable to stray magnetic fields in the vicinity or to extraneous seismic disturbances, but so that they do not cancel out localized pressure signals, i.e. the near-field of a disturbance attributable to a footstep on the surface of the earth in which the detector array is buried.

It is a principal object of this invention to provide a variable-reluctance detector configuration in which the magnetic circuit is shaped and oriented with respect to a magnet and a detecting coil such as to provide optimum sensitivity for a buried detector unit. Although it has not proven possible to make a generating unit responsive only to stress, it is the object of this invention to provide a unit which approaches this goal by virtue of its sensitivity to small strain displacements.

It is another object of this invention to provide an improved configuration for a strain-responsive detector which lends itself to being protected from deterioration during long intervals of burial in the earth. More specifically, the present strain detector is enclosed within a flexible elastomeric coating or a plastic sleeve which may be partially evacuated so that the sleeve conforms to the contours of the detector, the structure being such that the coating or sleeve does not interfere with efficient operation of the detector to produce a signal in response to a force applied at the surface of the earth.

Still another object of the present invention is to provide a detector array comprising a number of individual detector units supported on a cable in a linear array which is highly flexible so as to permit the detector array to be buried in the earth without damage, especially while the earth is being compacted above the array after the burial thereof, which compaction is of course necessary to conceal the fact that a detector is buried at that location, and is also made necessary in order to provide good coupling to a force from the surface of the earth down to the level where the transducer is buried.

Still another object of the invention is to provide a structure for magnetic detector units in an array which is to be buried wherein the configuration of the magnetically-permeable metal plates is such as to provide protection from mechanical damage to the windings located within the plates, such damage being possible during the operations of shipping and burying the array in the ground and compacting the earth above it, and from later attack by burrowing animals.

It is a major object of this invention to provide detector units which are laterally distributed individually or in spaced groups which are discrete from one another and located at intervals along the line of the array. In one embodiment of the present invention each detector unit comprises a single elongated coil comprising a number of windings surrounding an elongated magnet strip made of special material so that it is highly flexible. The single winding extends around the two larger dimensions of the elongated flexible strip, and then a multiplicity of paired iron or steel plates are mounted on opposite sides of the coil and magnetic strip, each pair of plates being very short as compared with the length of the strip magnet, and the successive pairs of plates being mounted in close proximity to each other along the length of the strip magnet so as to form a composite magnetic path comprising all of the plates on one side of the magnetic strip versus all of the plates on the other side of the magnetic strip separated by the air gaps between the plates on the respective sides, these air gaps being located in the vicinity of the peripheries of the paired plates and on the other side of the windings from the magnet strip.

Yet another object of the invention is to provide an array of adjacent detector units in which the individual units which are mutually spaced along the line of the array each have the directions of their windings reversed with respect to adjacent units so that each array comprises a sequence of alternately reversed generators. This periodic reversal of the generator units with regard to their phasings serves the purpose of reducing the effect on the overall array caused by extraneous electromagnetic fields or magnetic fields, which might cause an array having all of its coils wound in the same phase orientation to deliver a false signal. It should also be noted that this periodic reversal of the winding directions, each generator unit with respect to the adjacent generator units, has the effect of reducing the likelihood that a seismic disturbance of distant origin will set off false alarm signals in the array. Seismic waves in the frequency range of interest, namely 0.01 to 10 Hz, have relatively long wavelengths and arrive at an array in such a manner as to produce an earth strain of like magnitude and sign over large areas simultaneously causing half of the alternating generator units to deliver a signal of one polarity, and the interspersed remainder of the alternating units to deliver a similar signal but of opposing polarity. Conversely, the stress attributable to the near-field component of a human footstep above the array will tend to affect adjacent units differently since the stress attributable to the footstep is highly localized. Therefore, the output signals from the reversed units will be much less likely to cancel. The likelihood of response by the array to spurious disturbances can be further reduced by coupling the outputs of the generating units through differential amplifier circuits which tend to cancel the common-mode signal components appearing on the wiring coming from any of the detector units. In the transducer array as presently built, the polarity of the winding sense may reverse every 100 centimeters, each 100 centimeter grouping being considered as a single detector unit since it produces strain signals of the same sign throughout, although each such unit also includes a composite magnetic circuit comprising a number of paired permeable plates, and may also be subdivided into several sub-units consisting each of a single coil around an elongated magnetic strip (for example 25 cm long) for convenience in manufacturing.

Other objects and advantages of the invention will become apparent during the following discussion of the drawings, wherein one practical embodiment is illustrated.

THE DRAWINGS

FIG. 1 is a diagram of an array according to the present invention comprising multiple individual groups of detector units coupled through differential amplifiers to an alarm system;

FIG. 2 is an enlarged perspective view showing an elongated detector unit contained within a plastic sleeve and having output wires extending therefrom for connection with cable means on which the unit is mounted;

FIGS. 3 and 4 respectively, are magnetically-permeable metal plates which are paired to form a part of each detector unit;

FIG. 5 is an elongated coil including multiple windings;

FIG. 6 is a perspective view of a strip magnet which the coil of FIG. 5 surrounds; and FIG. 7 is an exploded cross-sectional view taken through a detector unit according to the invention.

Referring now to the drawings, FIG. 1 shows multiple detector units 10, 12 . . . 40 of the type shown in FIG. 2 on a larger scale. The detector units each have a coil of the type shown in FIG. 5 to be hereinafter discussed, and the output of each coil comes out by way of wires such as the wires 11, 13 . . . 41 which are connected to a suitable monitoring circuit, i.e. an alarm or other read-out generally referred to by the reference character A. The input to the alarm A is preferably coupled from differential amplifiers 14, 16, through full-wave rectifiers 42, 43, and a threshold-level detector T, the amplifiers having their inputs connected with the windings of the coils within the detector units in such phase as to augment the effect of near-field signals, but to cancel the effect of natural and spurious signals arriving at the array from distant sources so that they arrive in a broad frontal manner.

The coil wires 11, 13, and other represented by the reference character 41, are all grouped together in a cable C which joins the various detector units together and holds them as a linear array, providing the adjacent detector units with the proper spacings, the cross-section of the cable C in FIG. 1 being exaggerated as compared with the size of the detector units shown thereon.

FIGS. 2 through 7 illustrate a practical embodiment of a detector unit in which the magnet comprises an elongated flexible magnetized strip 20 as can best be seen in FIGS. 6 and 7. The strip of magnetic material 20 comprises a flexible plastic material filled with magnetized particles such that the strip can be provided with permanent magnetic poles N and S, the axis of which is directed parallel with the smallest dimension of the magnet strip 20. It will be seen in FIG. 7 that the polar axis of the magnet is vertical in the drawing. This strip magnet extends substantially the length of a detector unit and is surrounded by a multiple turn coil 22 as can be seen in FIG. 5, and in cross-section in FIG. 7. The two leads from the coil plus a ground wire pass through the cable 11 and are connected with the main cable C which supports the individual detector units in a linearly aligned mutually spaced relationship. The magnetic strip 20 passes between a large number of paired plates, one pair of which can be seen best in FIGS. 3 and 4. In this embodiment, the lower plate 24 comprises a central portion 25 and two upstanding flange portions 26 and 27, this structure being clearly shown in cross-section in FIG. 7. Thus, the periphery of the plate 24 provides an air gap in the vicinity of the top edges of the flange portions 26 and 27 which lie directly opposite the second plate 28, the periphery of the plate 28 being spaced close to but being held out of contact with the upper edges of the flanged portions 26 and 27 by an elastic strip 30.

The magnetic strip 20 extends full length through the detector unit 10 as seen in FIG. 2, except that it stops in the middle of the first plate 24' and in the middle of the last plate 24" so as to leave the last half of each of those plates free to receive the two extreme cross-over ends 22a and 22b of the coil 22. The lower plate including its central portion 25 and its flange portions 26 and 27 is lined with insulating tape 29 which serves to prevent mechanical damage to the outer periphery of the coil 22 such as might be caused by possible sharp edges of the metal plates 24 and 28. If desired, the coil 22 and the magnet strip 20 can be secured to each of the lower plates 24 by a flexible potting compound and/or by cements serving to hold the coil 22 and the magnet 20 against accidental displacement with respect to each of the lower plates 24.

Looking at FIG. 7, it will be seen that a resilient means comprising a foam plastic strip or pad 30 is laid over the top of the coil 22 and the top of the strip magnet 20, and then the upper plate 28 overlies the resilient means 30 which yieldably spaces the upper plate out of contact with the peripheral edges of the flange portions 26 and 27 of the lower plate 24. In addition, a conductive tape or coating such as an embossed aluminum tape 32 is secured by suitable adhesive to the lower surface of each bottom plate 24 and to the upper surface of each top plate 28, the aluminum tape being flexible so that it will permit unrestrained motion of the plates 28 and 24 toward and away from each other during stressing of the earth in which the array is buried. The ground wire G which is in the cable 11 is connected to the conductive tape 32 and serves to ground all of the external metallic parts of each detector unit, the ground wires G from the various detector units being all connected to the circuit ground of the amplifiers 14, 16 and of the alarm circuit A.

The detector units, as shown in FIG. 2, are provided with a plastic protective sleeve means to hold the parts against mutual displacement and especially to protect the coils and wiring. Each sleeve is made of a flexible plastic such as PVC, and may comprise a sleeve pulled over the entire length of the detector array, or alternatively separate sleeves pulled over the individual units and heat sealed at both ends, a suitable adhesive being applied wherever a cable goes through the plastic sleeve P. The sleeve should be slightly evacuated before sealing so as to cause it to lie snugly against, and conform with, the shape of the underlying transducer unit. It has been found helpful to heat the plastic sleeve just prior to evacuation so that it will follow the contour of the detector unit rather closely.

This configuration for each detector unit thus provides a sufficiently flexible detector unit which can follow irregularities in the earth, but which is also protected from deterioration due to moisture in the earth, or possible other minerals which might attack the metallic plates 24 and 28 as well as the coating or aluminum tape 32 by which the plates are conductively joined together and mutually grounded.

With regard to the wiring of the differential amplifiers 14, 16 and the alarm circuit A to the wires coming from the detector units, although the present drawing shows two coils individually coupled through separate differential amplifiers to the alarm circuit A, the coils of the various detector units can be differently connected, for instance, alternate units connected in series-aiding or series-opposing, or all units connected in series and then coupled through a single amplifier to the alarm circuit A. The threshold detector and alarm circuit are not specifically disclosed since they really form no part of the present invention. It is to be further understood that although FIG. 1 shows only several detector units connected in this manner with the alarm circuit A, that it is intended that a large number of such units be attached end-to-end in the desired phase relationship in order to produce a practical array which may extend through a very great linear distance. The length of 100 centimeters for a detector unit is not intended to limit these units, but only to illustrate a particular embodiment thereof according to which detectors are presently being built.

This invention is not to be limited to the exact form shown in the drawing, for obviously changes may be made therein within the scope of the following claims.

I claim:

1. A detector to be buried in a particulate medium and operative to generate signals in response to stressing of said medium and to deliver the signals to a monitoring circuit, comprising:
   a. an elongated assembly comprising multiple successive signal-generating detector units connected by cable means to said monitoring circuit; and
   b. each detector unit comprising multiple sets of paired opposed plates of magnetic material, the opposed plates being spaced apart in the direction of the thickness dimension of the unit at their central portions and the sets of plates having contiguous edges aligned with each other along the length dimension of the detector unit which is great as compared with its width and which edges closely approach each other to form air gaps, magnet means extending longitudinally between the central portions of the paired plates and spaced from their lateral edges and said magnet means having opposed poles spaced in the direction of the thickness dimension and located contiguous to the respective plates, a winding surrounding the width and entire length of the magnet means and disposed in the space between the lateral edges of the plates and the magnet means, and said winding being coupled to the cable means, and resilient strip means interposed between a plate of each pair and said magnet means and yieldably maintaining the air gaps by keeping the plates mutually separated at their peripheries.

2. A detector as set forth in claim 1, wherein said resilient means for maintaining the plates mutually separated comprises a strip of foamed plastic material interposed between said plate of each pair and the magnet means and extending across said winding and into the air gap between said lateral edges.

3. A detector as set forth in claim 1, wherein one of the plates in each pair comprises a recessed central portion within two upstanding lateral edge portions extending toward the other plate in the pair.

4. A detector as set forth in claim 1, wherein one of the plates in each pair comprises a channel having a central portion joining lateral edge portions approaching the other plate in the pair, plural successive channels being aligned in each detector unit, and the magnet means in each detector unit occupying only part of the central portion of each channel, and said winding comprising in each detector unit an elongated coil extending through the remainder of said central channel portions and linking the paired plates together, the coil lying between the magnet and said lateral edge portions.

5. A detector as set forth in claim 4, wherein the cable includes a grounding wire, and each successive detector unit includes a conductive flexible tape connected to the grounding wire and joining on one side of the detector unit one plate of each pair and joining on the other side of the detector unit the other plate of each pair.

6. A detector as set forth in claim 4, wherein the magnet means passes between all the paired plates in a unit and is surrounded by a single coil common to all of the pair plates, and said elongated magnet strip being made of a flexible plastic filled with magnetized material.

7. A detector as set forth in claim 6, wherein the magnetic poles of said magnet strip are all of one polarity on one side of the strip and of the opposite polarity on the other side of the strip.

8. The detector as set forth in claim 4, wherein each assembly comprises multiple elongated detector units arranged end-to-end with respect to each other, and flexible plastic sleeves surrounding the detector units, each sleeve being partially evacuated and sealed to make it conform with the contours of the unit.

9. The detector as set forth in claim 4, wherein each assembly comprises a number of successive elongated detector units connected by said cable means, the adjacent detector units being separated from each other by spacings.

10. The detector as set forth in claim 9, wherein the adjacent detector units have their windings mutually reversed relative to one-another to reduce the composite effect on the assembly of spurious excitations including stray electromagnetic fields, magnetic fields, and/or seismic waves.

* * * * *